UNITED STATES PATENT OFFICE.

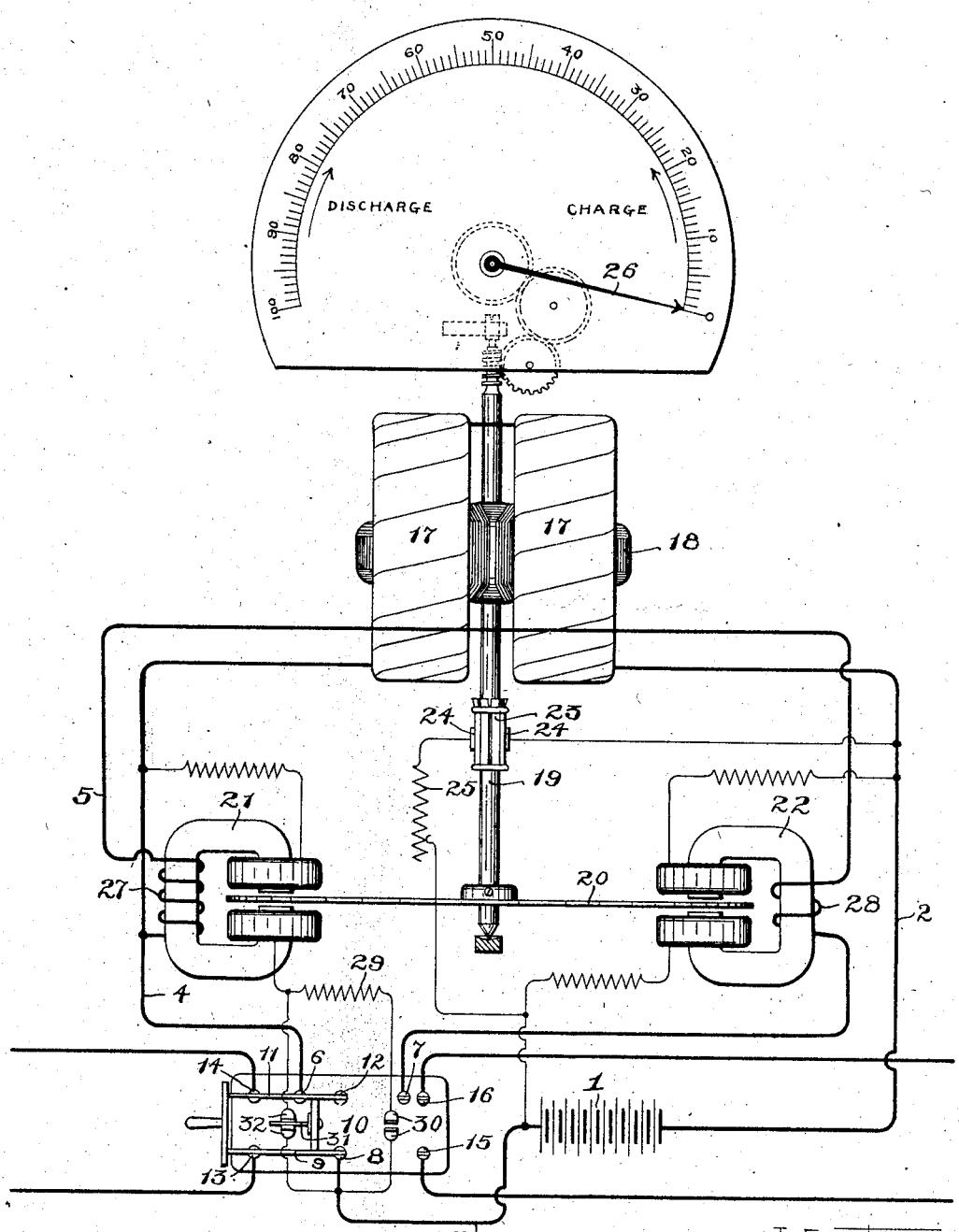

THOMAS DUNCAN, OF LAFAYETTE, INDIANA.

METER.

No. 796,058. Specification of Letters Patent. Patented Aug. 1, 1905.

Application filed January 8, 1902. Serial No. 88,832.

*To all whom it may concern:*

Be it known that I, THOMAS DUNCAN, a citizen of the United States, residing at Lafayette, in the county of Tippecanoe and State of Indiana, have invented a certain new and useful Improvement in Meters, of which the following is a full, clear, concise, and exact description, reference being had to the accompanying drawing, forming a part of this specification.

My invention relates to meters adapted for use in connection with storage batteries, and has for its object the provision of a meter that is adapted to rotate at different rates of speed per unit of load or energy upon variations in the rate of battery discharge.

By means of my invention the meter is caused to operate at an increased rate of speed per unit of load or energy upon an increase in the rate of discharge.

In the use of storage batteries it is well known that the output of the battery will always be less than the energy stored therein and that the battery loss will increase upon a sufficient increase in the rate of battery discharge. For example, if the battery is charged one thousand ampere-hours at its normal rate of charge—say one hundred amperes for ten hours—the total discharge at the same rate which can be made available without harm to the battery will not be more than about eighty per cent. of the energy charged into the battery with some makes of battery, this battery loss varying with different makes—that is, the battery will effectively operate at one hundred amperes for eight hours, giving out eight hundred ampere-hours after having received one thousand. If the rate of discharge is increased, the total output will be diminished. For example, with certain makes of battery the energy discharged will not be over about seventy per cent. if the rate is increased to one hundred and forty amperes per hour, sixty per cent. if the rate of discharge is doubled, and forty per cent. if the rate of discharge is quadrupled.

I have provided an instrument that is adapted to compensate for the varying battery losses due to the varying rates of discharge, so that the user of the battery may know when the available energy in the battery is spent. Ordinarily a meter associated with a storage battery that is discharged at varying rates will indicate the presence of more energy in the battery than actually exists. The meter of my invention is also adapted to measure the energy that is being stored in the battery, the meter when thus associated with the charging source of current being operatively dissociated from the means that cause the meter to operate at varying rates of speed per unit of load or energy at different rates of discharge.

The meter of my invention is particularly adapted for use in connection with motors employed in operating motor-vehicles where the rate of discharge is not constant, but is liable to be changed at any time. The preferred means for causing this variation in the rate of operation of the meter consists in the provision of a variable load that is automatically controlled by means subject to the variable volume of current flowing from the battery. This load is preferably in the form of an electromagnetic drag acting upon a disk coupled with the rotating element of the meter and having a winding subject to the pressure of the battery. This electromagnet is also provided with a winding in series with the battery, which acts in opposition to the shunt-winding in a degree dependent upon the flow of current or rate of discharge to decrease the force of the drag and permit the speed of the disk and rotating element of the meter to increase as the rate of discharge increases.

In my present invention I provide means for effecting an initial modification in the rate of operation of the meter per unit of load or energy when the battery is changed from its connection with the charging-machine to the translating means by means which preferably consists in a reduction of the load due to the said electromagnets, which load reduction may be accomplished by the inclusion of a resistance in circuit with one of the magnet-windings when the battery and translating means are in circuit, this resistance being excluded from circuit when the battery and charging-machine are connected, so that the load is increased to effect a reduction in the rate of operation of the meter.

In the preferred embodiment of the invention the electromagnet is provided with a winding that is connected in bridge of the conductors leading to the battery, the said resistance being included in this bridge or removed therefrom, as required.

I will explain my invention more fully by reference to the accompanying drawing, which is a diagrammatic view of a storage-battery system with the meter of my invention associated therewith.

In the drawing, a storage battery 1 is illustrated, having mains 2 and 3. The main 2 is provided with bifurcated branches 4 5, terminating in contacts 6 and 7, while the main 3 terminates in a pivotal mounting 8, upon which a switch-blade 9 of a switch 10 is secured. A second switch-blade 11 of the switch 10 is also placed upon a pivotal mounting 12. Terminals of a charging-circuit 13 and 14 are illustrated. Terminals 15 and 16 of conductors leading to translating means, as the motor of a motor-vehicle, are also illustrated.

When the switch 10 is thrown to the left, the charging-machine or source of current is thrown into circuit with the storage battery. When the switch is thrown to the right, the storage battery is thrown into circuit with the translating means.

I have illustrated a meter having a current-winding included in the main 2, this current-winding being subdivided into coils 17 17. The meter is also provided with a pressure-winding 18, included in bridge between the battery leads or mains. These windings of the meter are constantly in circuit with the battery irrespective of its association with the charging-machine or the translating means. The meter-winding 18 is preferably in the form of an armature and is mounted upon a spindle 19, at the lower end of which is provided a disk 20, arranged within the fields of damping-magnets 21 22. The shaft 19 also carries the commutator 23, against which bear brushes 24 24, that serve to include the armature of the meter in circuit, a choking and adjusting resistance 25 being also included in circuit with the armature.

The meter is provided with gearing at its upper end to actuate the measuring-index 26, which by coöperation with a suitable reading-scale, serves to indicate the amount of energy stored in the battery in charging and remaining in the battery in discharging.

The meter illustrated is adapted to measure in units of ampere-hours.

The fine windings of the electromagnets 21 and 22 are preferably included in independent shunt-conductors.

The core of the magnet 21 is provided with a winding 27, while the core of the magnet 22 is provided with a similar winding 28, these windings being connected in circuit with the branch conductor 5, being preferably included in series with each other. When the switch is thrown to the left in charging the battery, the windings 27 and 28 are cut out of circuit, the meter-circuit being completed by way of the branch conductor 4. When the switch is thrown to the right, the branch conductor 4 is disconnected, whereupon the meter-circuit is completed by way of the conductor 5 and the supplemental magnet-windings 27 28. The force of the electromagnetic drag due to the magnets 21 and 22 depends upon the difference in potential between the battery-terminals, and as that difference becomes less and less as the discharge proceeds the consequent drag will also decrease. The windings 27 28 exert an opposing or neutralizing effect upon the main shunt-windings of the magnets 21 22, effecting a corresponding reduction in the drag. As the magnetization due to these windings 27 28 varies with the amount of current flowing from the battery, the degree that the braking action is reduced will depend upon the rate of battery discharged. A large flow of current due to a high rate of discharge will obviously decrease the drag to a proportionately greater extent than a smaller flow of current due to a lesser rate of discharge, and by proper proportioning and calibration the meter may in this manner be made to compensate for the varying inefficiency of the battery throughout its entire range of operation.

To effect an initial compensation for battery loss, I provide a resistance 29, included in a branch conductor having contacts 30 30, that are electrically connected by a switch-blade 31 when the switch 10 is thrown to the right to connect the battery with the translating means, whereby this resistance is included in series with the shunt-winding of the magnet 21 to reduce the load imposed by this magnet upon the meter. When the switch 10 is thrown to the left, the supplemental switch-blade 31 engages contacts 32 32, that are included in a conductor in shunt of the conductor containing the resistance 29, so that this resistance is cut out of circuit while the charging-machine is in circuit with the battery, permitting a corresponding increase of the load due to the magnet 21 while the storage battery is being charged to compensate for battery loss.

Having thus described my invention, I claim as new and desire to secure by Letters Patent—

1. The combination with a storage battery, of a switch for including the same in circuit with the translating means or a charging source of current, a meter receiving current passing through the battery, an electromagnetic drag for the meter, and means for changing the effect of the winding of the said drag to increase the speed of the meter per unit of load or energy when the storage battery is changed from its connection with the charging source of current to the translating means, substantially as described.

2. The combination with a storage battery, of a switch for including the same in circuit with the translating means or a charging source of current, a meter receiving current passing through the battery, an electromagnetic drag having a winding in bridge of the main conductors leading to the battery, a resistance, and means for including the same in circuit with the said winding when the storage battery is connected with the translating means, whereby the speed of the meter may be increased per unit of load or energy, substantially as described.

3. The combination with a storage battery, of a switch for including the same in circuit with the translating means or a charging source of current, a meter receiving current passing through the battery, an electromagnetic drag having a winding in bridge of the main conductors leading to the battery, means for changing the effect of the winding of the said drag to increase the speed of the meter per unit of load or energy when the storage battery is changed from its connection with the charging source of current to the translating means, and a supplemental winding for the said drag included in series with the storage battery when the battery is connected with the translating means, the said supplemental winding serving to oppose the action of the main winding variably according to the rate of discharge, whereby as the rate of discharge increases the rate of operation of the meter per unit of load or energy will correspondingly increase to compensate for varying battery losses, substantially as described.

4. The combination with a storage battery, of a switch for including the same in circuit with the translating means or a charging source of current, a meter receiving current passing through the battery, an electromagnetic drag having a winding in bridge of the main conductors leading to the battery, a resistance, means for including the same in circuit with the said winding when the storage battery is connected with the translating means, whereby the speed of the meter may be increased per unit of load or energy, and a supplemental winding for the said drag included in series with the storage battery when the battery is connected with the translating means, the said supplementary winding serving to oppose the action of the main winding variably according to the rate of discharge, whereby as the rate of discharge increases the rate of operation of the meter per unit of load or energy will correspondingly increase to compensate for varying battery losses, substantially as described.

5. The combination with a storage battery, of a switch for including the same in circuit with the translating means or a charging source of current, a meter receiving current passing through the battery, an electromagnetic drag having a winding in bridge of the main conductors leading to the battery, and means for changing the effect of the winding of the said drag to increase the speed of the meter per unit of load or energy when the storage battery is changed from its connection with the charging source of current to the translating means, substantially as described.

6. The combination with a storage battery, of a switch for including the same in circuit with the translating means or a charging source of current, a meter receiving current passing through the battery, an electromagnetic drag for the meter, means for changing the effect of the winding of the said drag to increase the speed of the meter per unit of load or energy when the storage battery is changed from its connection with the charging source of current to the translating means, and a supplemental winding for the said drag included in series with the storage battery when the battery is connected with the translating means, the said supplemental winding serving to oppose the action of the main winding variably according to the the rate of discharge, whereby as the rate of discharge increases the rate of operation of the meter per unit of load or energy will correspondingly increase to compensate for varying battery losses, substantially as described.

In witness whereof I hereunto subscribe my name this 20th day of November, A. D. 1901.

THOMAS DUNCAN.

Witnesses:
SAMUEL R. BACHTEL,
FRANK V. NELSON.